United States Patent [19]
Demers

[11] 3,742,675
[45] July 3, 1973

[54] CONCEALED ANCHORING MEANS IN LAMINATED BEAMS

[76] Inventor: Harlan J. Demers, c/o Koppers Company, Inc.; Koppers Building, Pittsburgh, Pa. 15219

[22] Filed: Aug. 18, 1971

[21] Appl. No.: 172,668

[52] U.S. Cl. .......................... 52/721, 52/698, 85/35
[51] Int. Cl. ............................................. E04c 3/12
[58] Field of Search ................. 85/35; 52/642, 721, 52/698

[56] References Cited
UNITED STATES PATENTS
3,423,899  1/1969  Demers ............................... 52/721
FOREIGN PATENTS OR APPLICATIONS
950,257   2/1964  Great Britain ....................... 52/509
581,645  12/1924  France .................................. 85/35

Primary Examiner—John E. Murtagh
Assistant Examiner—Carl D. Friedman
Attorney—Olin Williams, Herbert J. Zeh, Jr. et al.

[57] ABSTRACT

A laminated beam composed of at least two laminated elongate members has a concealed anchoring means embedded in the beam between the mating surfaces of the elongate members whereupon the laminated beam may be concealably fixed to another structure. The anchoring means comprises a nut having a tube fixed to one face thereof with the longitudinal axis of the tube being in axial alignment with the aperture of the nut. At least one of the mating surfaces has a first recess conforming to the anchoring means and a second axial recess in axial alignment with the aperture of the nut extending from the nut to the exterior of the beam to receive a bolt extending from the other structure.

5 Claims, 3 Drawing Figures

PATENTED JUL 3 1973  3,742,675

INVENTOR.
HARLAN J. DEMERS
BY Fred C. Trenor, II
Agent

CONCEALED ANCHORING MEANS IN LAMINATED BEAMS

CROSS REFERENCE TO RELATED APPLICATIONS

This application is related to my application entitled, "Concealed Anchoring Means in Laminated Beams," Ser. No. 172,667, filed Aug. 18, 1971.

BACKGROUND OF THE INVENTION

The present invention relates to a laminated beam having a concealed anchoring means for concealably joining the laminated beam to another structure.

Anchoring means such as, for example, nails, screws, bolts and the like are well known to connect together wooden beams. Such anchoring means are exteriorly accessible, and are unattractive in appearance, detracting from the natural beauty of wood. They also may project from the wooden beams to catch clothing, abrade the hands and the like.

In response to the foregoing disadvantages of conventional anchoring means, glues and the like have been developed and used to join wooden members. But, the use of glues is undesirable in many instances because glues are inherently messy and, in some instances, difficult to prepare, and because the freshly glued joints must be held together in firm engagement with clamps and the like until the glue sets to form a strong bond between the joints.

DESCRIPTION OF THE PRIOR ART

Concealed anchoring means have been developed, such as, for example, the device described in U.S. Pat. No. 3,057,024 wherein the concealed anchoring means comprises a short cylindrical metal bar having dogs on each of its ends, with one end being disposed into a socket in one wooden member and the other end being disposed into a socket in the other wooden member.

The disadvantage with the foregoing device and other similar devices is that they have complex designs and are difficult to conceal within the wooden beams. On the other hand, I have developed a concealed anchoring means that has a simple design and that is easily concealed in laminated wooden beams.

SUMMARY OF THE INVENTION

A wooden laminated beam comprises at least two elongate members laminated together with each member having a mating surface in a mating relationship to each other. The anchoring means for connecting the laminated beam to another structure includes a nut having a tube fixed to one face of the nut with the longitudinal axis of the tube being in axial alignment with the aperture of the nut. At least one of the mating surfaces has a first recess conforming to the shape of the anchoring means into which the anchoring means is disposed and a second recess in axial alignment with the aperture of the nut extending from the nut to an exterior surface of the beam.

DETAILED DESCRIPTION

Figure 1:
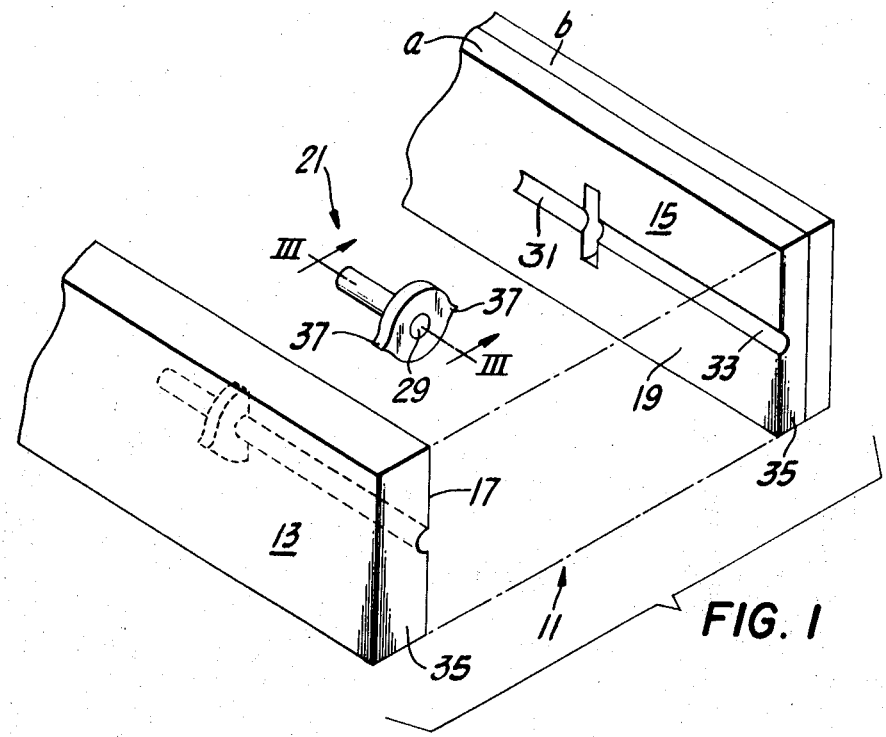
FIG. 1 is an exploded view of a laminated beam including an embodiment of the concealed anchoring means made in accordance with the invention.
Figure 2:
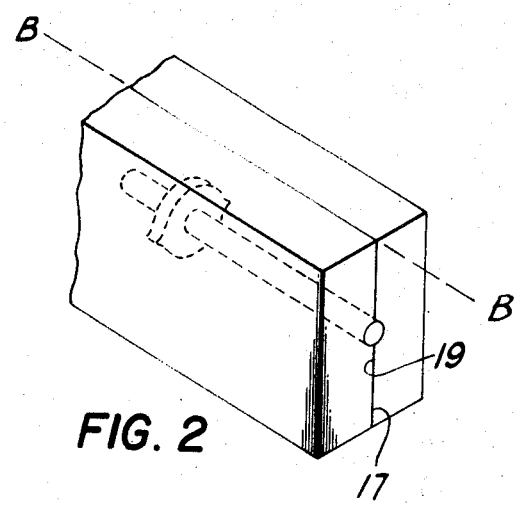
FIG. 2 is an isometric view of the laminated beam of FIG. 1 illustrating the concealed anchoring means in phantom lines; and, FIG. 3 is a side elevational view of the concealed anchoring means of FIG. 1.

In FIG. 1 a conventional wooden laminated beam, generally indicated at 11, comprises at least two wooden beam members 13 and 15 each of which may be unitary or may comprise a series of laminated members. The beam 13 as illustrated in FIG. 1 is unitary whereas beam 15 is a lamination of two members a and b. Beam members 13 and 15 have mating surfaces 17 and 19, respectively, which are in a contiguous and mating relationship to each other as shown in FIG. 2.

Figure 3:
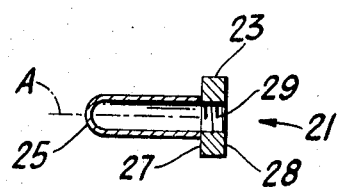

In accordance with the invention the concealed anchoring means, generally indicated at 21, is embedded in the laminated beam 11 between the two mating surfaces 17 and 19 and is generally concealed from view. In FIG. 3 the anchoring means 21 comprises a nut 23 having a tube 25 fixed to one face 27 of the nut 23 which extends axially from the face 27. The longitudinal axis A of the tube is in axial alignment with the aperture 29 of the nut. The nut 23 is embedded in the beam as shown in FIGS. 1 and 2 between the mating surfaces 17 and 19 such that it cannot be withdrawn from the beam. The anchoring means 21 is generally concealed from view and is contained entirely within the beam.

Each mating surface 17 and 19 includes a first recess or groove 31 which conforms to the shape and dimensions of the anchoring means 21 as illustrated in FIG. 1. The first recess 31 is preformed into the respective members 13 and 15 before the members are laminated together. Each mating surface 17 and 19 also includes a second recess or groove 33 extending from the nut to an exterior surface 35 of the beam which is in axial alignment with the aperture 29 of the nut. The second recess 33 is capable of receiving the threaded shank of a bolt or the like so that the beam 11 may be anchored by engagement with the nut 23. If desired, however, the anchoring means 21 may be embedded in the beam such that the other face 28 of the nut is flush with the exterior surface of the beam.

The angular orientation of the anchoring means 21 with respect to the longitudinal axis B of the laminated beam is a matter of choice. As shown in the figures the anchoring means is aligned with the longitudinal axis B of the beam; however, it may extend perpendicularly from the longitudinal axis B or at an angle thereto.

As an optional feature of the invention the anchoring means 21 includes a torque-preventing means. To this end protrusions 37 extend outwardly radially from the edge of the nut. These protrusions 37 prevent the anchoring means 21 from twisting in the laminated beam when a torque is applied to the nut. It will be recognized, however, that other torque-preventing means may be used in accordance with the invention.

In the manufacture of the laminated beam of FIGS. 1 and 2 the recesses 31 and 33 are formed in the mating surfaces 17 and 19 in a conventional manner. The anchoring means 21 is disposed into the recess 31 of one member 13 or 15. The other member is laminated thereto in a conventional manner to produce a laminated beam having the concealed anchoring means embedded in the beam.

The concealed anchoring means of this invention has several advantages. It permits the blind fastening of various components such as, for example, the fastening of mullins of windows to their head and sill units, the fastening of the components of space tresses and the like. The concealed anchoring means herein permits a more uniform and gradual transfer of mechanical stresses from the anchoring means to the wood and does not penetrate the outside stress surfaces of the wood component members so that a stronger structure is provided.

What is claimed is:

1. A wooden laminated beam comprising:
  a. at least two elongate members laminated together; each member having a mating surface in a mating relationship to each other;
  b. anchoring means for connecting said laminated beam to another structure including a nut having a tube fixed to one face of said nut with the longitudinal axis of said tube being in axial alignment with the aperture of said nut; said anchoring means being embedded in said beam between said mating surfaces such that it cannot be withdrawn from said beam; and
  c. at least one of said mating surfaces having a first recess conforming to the shape of and for receiving said anchoring means, and having a second recess in axial alignment with the aperture and extending from said nut to an exterior surface of said beam.

2. The wooden laminated beam of claim 1 including a torque-preventing means on said anchoring means for preventing it from twisting within said beam when a torque is applied to said anchoring means.

3. The wooden laminated beam of claim 2 wherein said torque-preventing means comprises a radial protrusion extending outwardly from said nut.

4. The wooden laminated beam of claim 1 wherein said elongate members comprise a series of wooden boards laminated together.

5. A wooden laminated beam comprising:
  a. at least two elongate members laminated together; each member having a mating surface in a mating relationship to each other;
  b. anchoring means for connecting said laminated beam to another structure including a nut having a tube fixed to one face of said nut with the longitudinal axis of said tube being in axial alignment with the aperture of said nut; said tube being embedded in said beam between said mating surfaces such that the other face of said nut is flush with an exterior surface of said beam; and
  c. at least one of said mating surfaces having a recess conforming to the shape of said anchoring means for receiving said anchoring means.

* * * * *